Nov. 26, 1929.  A. E. BURTCHAELL  1,737,042
APPARATUS FOR ARRANGING ARTICLES FOR STACKING
Filed Feb. 20, 1926   2 Sheets-Sheet 2
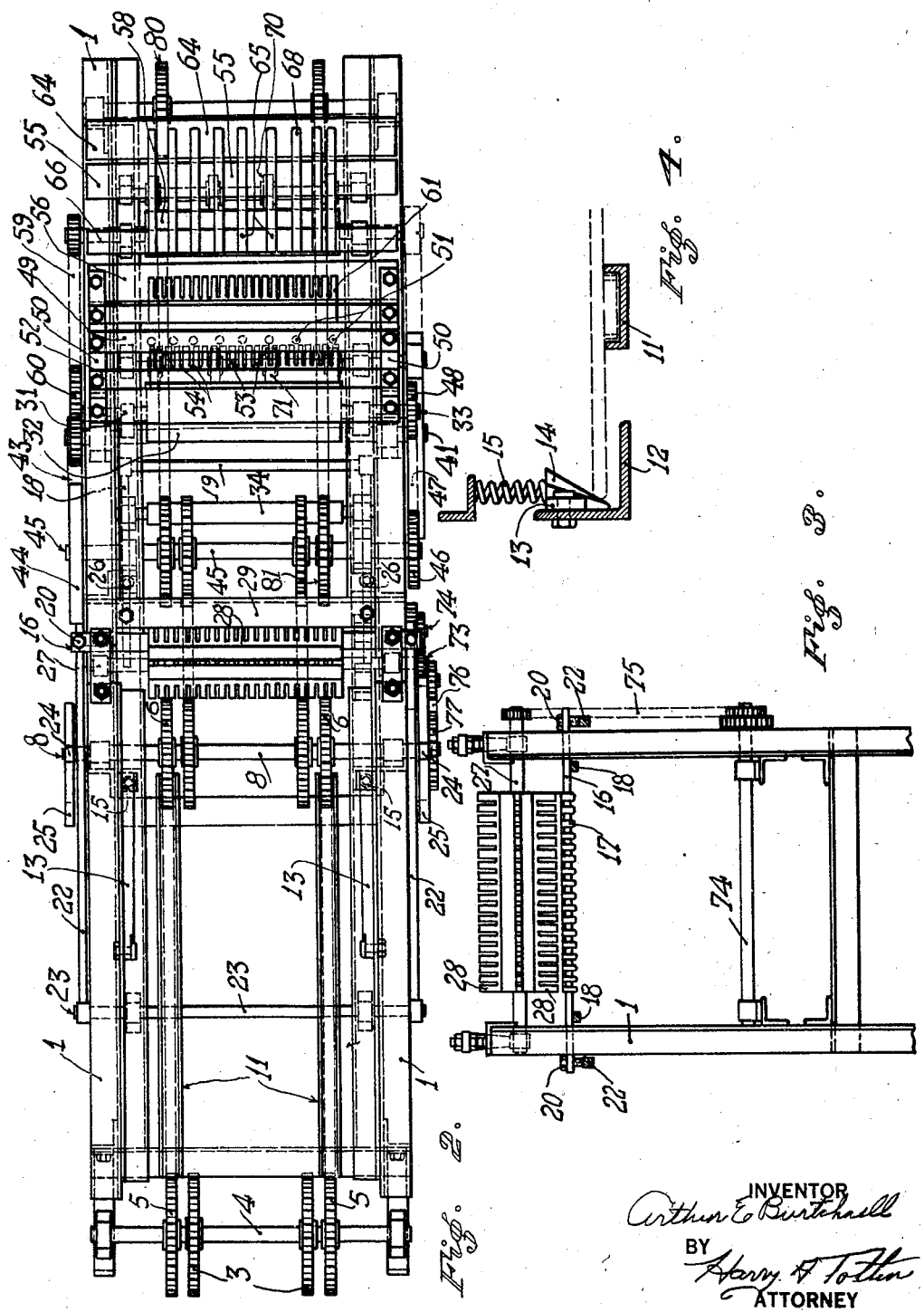

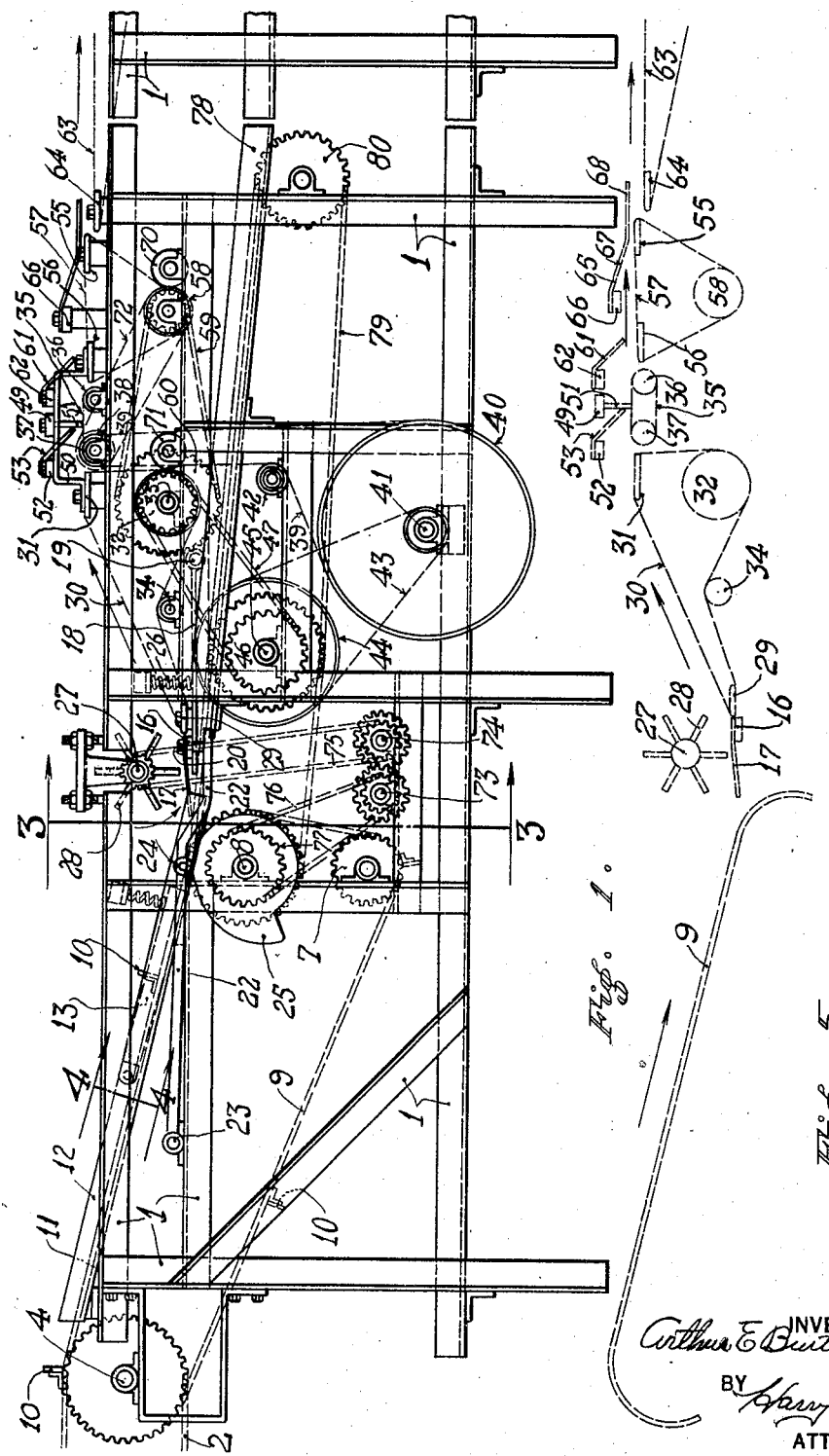

Patented Nov. 26, 1929

1,737,042

UNITED STATES PATENT OFFICE

ARTHUR E. BURTCHAELL, OF SAN FRANCISCO, CALIFORNIA

APPARATUS FOR ARRANGING ARTICLES FOR STACKING

Application filed February 20, 1926. Serial No. 89,543.

This invention relates to an apparatus for arranging articles, preferably flat disk shaped articles, such as cookies, crackers, cakes and the like, which have been removed from a surface on which they have been arranged in successively crowded rows, into parallel rows with corresponding edges of adjacent articles in any one row overlapping, positioning the articles at an incline to the horizontal, enabling any group of articles in any one row to be quickly arranged in stack formation by grasping two widely separated articles in any given row, and pushing the same toward each other, causing the intermediate articles to ride on one another and to be raised from a relatively horizontal position with their edges in slightly overlapping relation to a horizontal row with the articles in substantial vertical position, with their faces in contact, enabling the assembled group to be picked up and quickly packaged.

The apparatus is designed primarily for removing cakes and other baked goods from baking pans presented to the apparatus in timed relation in an endless stream and in removing the articles in such manner as to enable the stacking and packing of the same in a symmetrical and uniform manner, rapidly, at little cost, and with but few operators.

The apparatus consists essentially of an arrangement of coacting conveying belts for receiving the articles as removed from the pans, the belts travelling at prearranged speeds and arranged in cooperating relation to automatically transfer the articles from one belt to another; there being in cooperation with certain of the belts, devices or mechanism for aligning the articles in rows and for insuring their discharge from the belts in a predetermined manner.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction without departing from the spirit or sacrificing any of the advantages of the invention.

In the drawings illustrating one embodiment of my invention—Fig. 1 is a view in side elevation.

Fig. 2 is a view in top plan.

Fig. 3 is a vertical transverse sectional view on line 3—3 of Fig. 1.

Fig. 4 is a detail sectional view on line 4—4 of Fig. 1.

Fig. 5 is a diagrammatic view illustrating in outline the various belt flights arranged in cooperating relation.

To one end of the frame 1 are delivered, by an endless tray feed conveyer, consisting of chains 2 operating over sprockets 3, successive filled trays or pans containing the articles to be sorted, stacked and packed. These pans are the usual baking pans or trays having a relatively narrow upstanding peripheral edge.

The sprockets 3 are carried by a shaft 4 at the end of frame 1, and the shaft also mounts sprockets 5 in alignment with sprockets 6 on a shaft 8 disposed parallel with shaft 4 and carried by frame 1.

Sprockets 5 and 6 mount endless conveyer chains 9 carrying aligned angle brackets 10. These chains 9 also operate over idler sprockets 7 and constitute a conveyer for receiving the trays from the tray feeding conveyer and for propelling the same to the means for removing articles from the upper surface of the pans. The upper flight of the chains 9 operate in incline guides 11, U-shaped in cross section, and on which slide the bottoms of the successive pans or trays are conveyed by the chains longitudinally of one end of the frame 1.

The opposite sides of the pans or trays while being conveyed by chains 9 also overlie pan guides 12 disposed parallel with the sides of the frame 1, Fig. 4. The guides 12 pivotally mount arms 13 extending parallel therewith and which carry on their ends substantially wedge shaped pan centering members 14 which center the successive pans relatively to the pan scrapers hereinafter described, and hold the pans from riding above the angle brackets 10. Springs 15 maintain the centering members 14 in yieldable contact with the pan edges.

The articles are removed from the pans by the hereinafter described mechanism operating as follows.

Disposed transversely of the frame 1, approximately at the ends of the guides 12, is a bar 16 mounting corresponding ends of a plurality of parallel flexible scrapers 17 extending at a slight downward incline from and at substantially right angles to the edge of the bar toward the direction of approach of the filled pans as conveyed by the chains 9. The bar 16 connects at its ends with supporting lever 18 fulcrumed at corresponding ends to the ends of a shaft 19 disposed transversely of the frame 1 approximately midway of its length. At its ends the bar 16 carries adjusting screws 20 with which are adapted to contact the free ends of cam levers 22 of relatively long length and fulcrumed at their opposite ends to a shaft 23 extending transversely of the frame 1 below the guides 11. Each cam lever 22 carries a cam roller 24 riding on the peripheries of the respective cams 25 carried on the ends of shaft 8. The cams are timed relatively to the pan feed brackets 10 to raise the scrapers 17 as the forward flanged edges of successive pans approach the ends of the scrapers, lower the scrapers onto the pan surface to release the articles therefrom, and enable the articles to slide upwardly thereon, and to raise and clear the rear flange of the pan and pan feed brackets as the same approach the scraper ends. The adjustment of the screws 20 varies the movement of the scrapers 17. Springs 26 bear on levers 18 to normally press the same downwardly to maintain the screw ends in contact with the ends of cam levers 22.

On a rotatable shaft 27 extending parallel with and above the scraper 17 are mounted the flexible scraper blades 28, preferably of rubber, disposed radially of the shaft with their free ends adapted to contact with the articles as the same ride upwardly on the surface of the scraper 17, with their adjacent edges in contact, and to propel or sweep them in horizontal rows over the scrapers and discharge them from the rear edge thereof onto the take off belt, hereinafter described.

Disposed transversely of the arms 18, immediately in rear of the bar 16, is a belt guide 29 adjustable with the arms and around the same operates the take-off belt 30, the upper flight of which is upwardly inclined, and at its upper end passes over a guide 31, and after leaving the guide extends downwardly over a roller 32 on a rotatable shaft 33, and extends over an idler roller 34 to a point where it connects with the lower end of the portion constituting the upper flight. The shaft 33 is disposed transversely of the frame 1 beneath the guide 31. The take-off belt travels at a speed slightly less than that of the conveyor chains 9, the relatively normal speeds being —the conveyor chains 9—32 feet per minute and the take-off belt—28 feet per minute. Due to the slower speed of the take-off belt than that of the conveyor chains, the articles as delivered to the take-off belt by the blades 28 will lie in close relation on the surface of the belt during the travel of its upward flight.

From the take-off belt the articles are delivered to a belt 35 of relatively short length, with its upper flight disposed in a horizontal plane, the belt operating at its ends over relatively small rollers 36 and 37, the roller 37 being rotated to drive the belt 35 at a relatively high speed, approximately 150 feet per minute, by the following mechanism.

Cooperating with a pulley 38 on the end of roller 37 is a belt 39 passing around the periphery of a relatively large diameter wheel 40, carried by a shaft 41. The belt 39 is maintained under tension by the idler pulley 42 beneath which it passes. The wheel 40 is driven through a flexible connection 43 passing around another wheel 44 of a diameter smaller than the wheel 40 and carried by a shaft 45 disposed transversely of the frame 1 at a point approximately beneath the idler wheel 34. The shaft 45 mounts a sprocket 46 over which operates a chain 47 riding on a sprocket 48 associated with shaft 33, thus a driving connection is established between shafts 45 and 33.

Disposed transversely of the plane of travel of the high speed belt 35 and arranged above its upper flight is a supporting bar 49 carried at its ends on brackets 50. Depending from the bar 49 are a plurality of parallel spaced division pins 51, the lower ends of which terminate substantially in contact with the upper flight of belt 35. These division pins are separated from each other a sufficient distance to admit of the articles conveyed by the belt 35 to pass between the same and their function is to arrange the articles as conveyed by the belt 35 so that they will be discharged therefrom onto the spacing or stacking belt, hereinafter described, into parallel spaced rows. Also carried by the brackets 50, in advance of the member 49, is a support 52, downwardly from which extends a flexible plate 53 disposed at an incline, with its lower free edge terminating adjacent the lower ends of the pins 51. The lower edge of the plate 53 is slotted at 54 to provide yielding fingers beneath which, with their upper surfaces in contact, travel the articles as propelled by the belt 35. The function of the plate 53 is to maintain the articles in a layer of single thickness, and to prevent their jumping each other when passing between the pins 51.

It will be observed that from the relatively different speeds of the take-off belt 30 and the high speed belt 35 that the articles as slowly delivered to the high speed belt 35 from the take-off belt 30 are quickly propelled by the high speed belt, and due to its short length, are rapidly discharged therefrom after the same are spaced by passing between the pins 51. From the high speed belt 35 the articles are delivered onto a spacing or stacking belt, constructed and operated in the following manner.

Disposed transversely of the frame 1 are the belt guides 55 and 56, the guide 56 lying with one edge in close proximity to the roller 36 and over said guides operates a spacing belt 57 which also operates over a roller 58, driven by a connection 59, operated from a sprocket 60 carried by the shaft 33. The upper flight of the spacing and stacking belt 57 is disposed in a plane slightly below the plane of the upper flight of the high speed belt 35, and overlying the receiving end of the upper flight of the belt 57 is a flexible plate 61, slotted at its lower end with its upper end carried by a support 62 disposed parallel with the supports 49 and 52. The plate 61 extends in close proximity to the upper flight of the spacing belt 57 and its function is to eliminate climbing of the articles as they are passed onto the spacing and stacking belt from the high speed belt 35. The spacing and stacking belt operates at a speed of approximately 42 feet per minute, and it will be observed that this is greater than that of the take-off belt and less than that of the high speed belt, but it insures the articles to be deposited thereon by the high speed belt in substantially uniform rows, parallel spaced from each other, with the articles of any given row in close relation to each other.

From the spacing or stacking belt the articles are discharged onto a packing belt, traveling at a considerably lower speed than the spacing or stacking belt, the speed of the packing belt being approximately 8 feet per minute. The forward end of the packing belt 63 operates over a belt guide 64, disposed parallel with the guide 55, in close proximity thereto, and in a plane slightly beneath the same and over said guide 64 the belt 63 operates in the direction of the arrows, Figs. 1 and 5.

As previously explained, the belt 63 operates slightly less than one-fifth the speed of the spacing or stacking belt, therefore, it will be apparent that the articles delivered thereonto by the belt 57 will lie in slightly overlapping relation. To insure this overlapping relation, a plurality of stacking springs 65 supported at one end on a bar 66, at right angles from which the same extend, with their main leg 67 downwardly inclined and terminating above the belt guide 55, are provided. The free ends 68 of the springs 65 are disposed in a substantially horizontal plane overlying the belt guides 55 and 64, insuring the articles as they pass over the guide 65 of the belt 57, to assume a horizontal position until their rear edges leave the discharge edge of the guide 55. This action insures successive articles to assume their proper relation on each other when deposited onto the packing belt 63.

It will thus be apparent that by this apparatus the articles which are removed from the upper surface of the pans and which are contained thereon, all in the same plane, are separated into parallel rows, and that the articles of any given row are deposited one on the other in inclined relation, so that the operator may group two widely separated articles of any given row, and by moving the same toward each other, will cause the adjacent articles of that row to gradually assume a vertical edge position with their faces in contact, enabling these articles, while pressure is maintained on the end members, to be lifted as a unit. By this apparatus the now prevailing practice of operators by hand picking the articles, one at a time from the pan, is obviated, and mechanical means are provided for carrying out this work.

To insure contact of the spacing and stacking belt 57 with the roller 58, and the take-off belt with the roller 32, yieldable surface squeezing rollers 70 and 71 are provided, Fig. 1 of the drawings.

The spacing and stacking belt 57 is driven through a connection 72 from the roller 37.

Parallel intergeared shafts 73 and 74 are rotatably mounted beneath the shaft 27 and the latter shaft connects through a drive connection 75 with shaft 74, so that the shaft 27 will rotate in the direction of the arrow, Fig. 1. The shaft 73 is connected through a chain 76 with a sprocket 77 on shaft 8.

The empty pans, as the same pass beneath the scrapers 17, are propelled longitudinally of the angle guide 78 by endless conveyers 79, operating at one end over sprockets 80, and its opposite ends over sprockets 81 on shaft 45. The endless tray feed conveyer chains 2 afford a driving means for the member 9 and the parts interconnected and intergeared with each other consisting namely of the shaft 8, gear 7, shafts 73 and 74 and shaft 27. The shaft 41 is the power or drive shaft for the respective conveyor belts 30, 35, 57 and 63.

I claim:—

A cake or biscuit stacking apparatus comprising an endless belt for receiving articles to be stacked, a second endless belt travelling at a speed higher than the first belt for receiving the articles discharging from the first belt, article aligning pins projecting downwardly in parallel relation into proximity to the surface of the second belt whereby the articles conveyed thereby are caused to travel therebetween and are thereby formed in parallel rows, means projecting between the pins for acting on the rows of articles as formed to preclude the articles from riding one on another, a third endless belt travelling at a speed less than that of the second belt for receiving articles discharged from the second belt in aligned rows with the articles of the respective rows in close relation, an endless stacking belt travelling at a speed less than that of the third belt with its receiving end slightly lower than the discharge end of the third belt for receiving articles from said third belt, and springs overlying the respective rows of articles and projecting beyond the discharge end of the third belt, whereby the articles discharge therefrom onto the stacking belt in a substantially horizontal position.

In testimony whereof I have signed my name to this specification.

ARTHUR E. BURTCHAELL.